(12) United States Patent
Yachide et al.

(10) Patent No.: US 9,477,799 B2
(45) Date of Patent: Oct. 25, 2016

(54) HIERARCHICAL DETERMINATION OF METRICS FOR COMPONENT-BASED PARAMETERIZED SOCS

(71) Applicant: CANON KABUSHIKI KAISHA, Tokyo (JP)

(72) Inventors: Yusuke Yachide, St Leonards (AU); Haris Javaid, Kensington (AU); Sridevan Parameswaran, Kensington (AU)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/554,813

(22) Filed: Nov. 26, 2014

(65) Prior Publication Data

US 2015/0154330 A1    Jun. 4, 2015

(30) Foreign Application Priority Data

Nov. 29, 2013    (AU) ................................ 2013263846

(51) Int. Cl.
  *G06F 17/50*  (2006.01)
  *G06F 9/455*  (2006.01)
(52) U.S. Cl.
  CPC ........... *G06F 17/5022* (2013.01); *G06F 9/455* (2013.01); *G06F 2217/02* (2013.01)

(58) Field of Classification Search
None
See application file for complete search history.

(56) References Cited

PUBLICATIONS

T. Givargis, F, Vahid, J. Henkel. System-level Exploration for Pareto-optimal Configurations in Parameterized Systems-on-a-chip. In Proc. of International Conference on Computer Aided Design (ICCAD), Proceedings from International Conference on Computer Aided Design (ICCAD), Nov. 2001; IEEE/ACM: Nov. 2001.

*Primary Examiner* — A. M. Thompson
(74) *Attorney, Agent, or Firm* — Canon USA, Inc. IP Division

(57) ABSTRACT

A method of determining a metric of a System-on-Chip (SoC), the method comprising: receiving a model dependency graph representing the SoC, the model dependency graph having a plurality of nodes representing components of the SoC and their models, and a plurality of directed edges between the nodes representing variables passed between the nodes of the model dependency graph; modifying the model dependency graph by clustering a plurality of strongly connected nodes in the model dependency graph into a single clustered node to form a clustered model dependency graph; determining an execution schedule according to a direction of an edge in the clustered model dependency graph; and executing models in the clustered model dependency graph according to the execution schedule to determine metrics of the SoC.

7 Claims, 15 Drawing Sheets

| Comp. | Model Type |
|---|---|
| SoC | Analytical |
| PE | Analytical |
| Proc | Cycle-accurate |
| L1 IC | Cycle-accurate |
| L1 DC | Cycle-accurate |
| L2 UC | Trace-based |
| Mem | Analytical |

# HIERARCHICAL DETERMINATION OF METRICS FOR COMPONENT-BASED PARAMETERIZED SOCS

REFERENCE TO RELATED PATENT APPLICATION(S)

This application claims the benefit under 35 U.S.C. §119 of the filing date of Australian Patent Application No. 2013263846, filed 29 Nov. 2013, hereby incorporated by reference in its entirety as if fully set forth herein.

TECHNICAL FIELD

The present invention relates to automation tools for designing digital hardware systems in the electronics industry and, in particular, to systematically and efficiently determine metrics for component-based parameterized System-on-Chips (SoCs) where an SoC is an integrated circuit that contains components of a processing system, the components themselves possibly containing sub-components and so on.

BACKGROUND

The continuous increase in transistor density on a single die has enabled integration of more and more components in SoCs, such as multiple processors, memories, and so on. Although integration of tens of thousands of components has significantly improved the intrinsic computational power of SoCs, it has correspondingly increased the design complexity, adding to the well-known problem of design productivity gap. To meet time-to-design and time-to-market deadlines, industry has primarily shifted to the use of parameterized components which allow design reuse and configuration of parameters to optimize the system under design for different metrics (such as performance and power).

The design and optimization of component-based SoCs faces a major challenge. The "design space" of a component-based SoC is defined as the universe of all the possible combinations of component parameters, where one combination of component parameters represents a single "design point". A designer has to explore the design space to identify the optimal set of parameters for all the components (referred to as the optimal design point) with respect to an objective function. The effectiveness of design space exploration is limited by the high dimensionality of the design space, and the typically long simulation times required to determine the metrics associated with individual design points. For example, if a multiprocessor system-on-chip (MPSoC) contains parameterizable processors (having associated parameters such as processor type, frequency, etc.), parameterizable memory elements (having associated parameters such as memory type, size, speed, etc.), parameterizable interconnect elements (having associated parameters such as bus width, etc.) and so on, then clearly the number of design points is very large. In such cases, it is typically infeasible to cycle-accurately simulate all the design points and search through them to find the optimal design.

There is a large body of work on computation/estimation of metrics such as performance, power and energy for SoCs. Some works are ad-hoc in nature because they are applicable to a single SoC architecture. Others are relatively systematic in the sense that they can estimate multiple metrics and are applicable to a number of architectures with various components. The following paragraphs report current approaches to this problem.

One approach proposes a system-level performance estimation method for MPSoCs where instruction-level traces of processors are transformed into coarse-grained system-level traces. These system-level traces are then replayed in a SystemC simulator for quick performance estimation.

Another approach proposes a hybrid simulation method where a target instruction set simulator and a native simulation on a host are combined to speed up the performance estimation.

The aforementioned estimation methods are tailored towards specific architectures, and hence are considered to be ad hoc in nature.

Another approach adopts a systematic methodology by distinguishing between application and architecture models. Application models generate coarse-grained traces which are utilized in the architecture models through trace-driven simulation for quick performance estimation.

Another approach targets both performance and power estimation through the combined use of pre-characterization of SoC components and transaction-level modelling of the SoC. This computes the power consumption of a component-based SoC using concurrent and synchronized execution of individual power simulators of its components.

Another approach attempts a systematic integration of component simulators at different levels of abstraction for estimation/computation of any metric. This approach focuses on the issues and requirements for seamless integration of simulators for their fully or semi-automated invocation. In this approach, a designer himself has to determine the execution order of the simulators and how many times each simulator should be executed for a given design space.

Another approach proposes a divide-and-conquer-based approach to explore the design space efficiently. This approach describes a system as a combination of sub-systems (or components) that do not depend on each other, and assigns the parameters of the design space to individual sub-systems accordingly. As such, the design space of the system is partitioned into non-overlapping sub-spaces. Each sub-space is explored to find a centroid design point based upon its performance goals (which are computed from the system-level performance goals). For exploration of a sub-space, performance models (such as simulators, analytical equations, etc.) are used to calculate the performance of all the design points in the sub-space. The centroids of each sub-space are combined to create the system design point that fulfils the system-level performance goals. In this approach, a designer cannot decompose a system into its components if changing the parameters of one component affects the performance of another component in the decomposition whose parameters are not changed. As a consequence, this approach can only model a system consisting of simple sub-systems.

SUMMARY

It is an objective of the present invention to substantially overcome, or at least ameliorate, one or more disadvantages of existing arrangements.

Disclosed are arrangements, referred to as MESoC (Metric Estimation for a System on Chip) arrangements, which seek to systematically and efficiently compute metrics associated with design points of an SoC by systematically and efficiently computing metrics of the design points of a
} component-based SoC using a model dependency graph to capture models of components in the SoC and their dependencies, replacing a set of interdependent models in the model dependency graph with a single, equivalent multi-component model, automatically generating an execution schedule of the component models from the model dependency graph, and ensuring that a near-minimum number of model executions are used for a component model According to a first aspect of the present disclosure, there is provided a method of determining a metric of an SoC, the method comprising:

receiving a model dependency graph representing the SoC, the model dependency graph having a plurality of nodes representing components of the SoC and a plurality of directed edges between the nodes representing variables passed between the nodes of the model dependency graph;

modifying the model dependency graph by clustering a plurality of strongly connected nodes in the model dependency graph into a single clustered node to form a clustered model dependency graph;

determining an execution schedule according to a direction of an edge in the clustered model dependency graph; and executing models in the clustered model dependency graph according to the execution schedule to determine metrics of the SoC According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Context

Figure 1A:
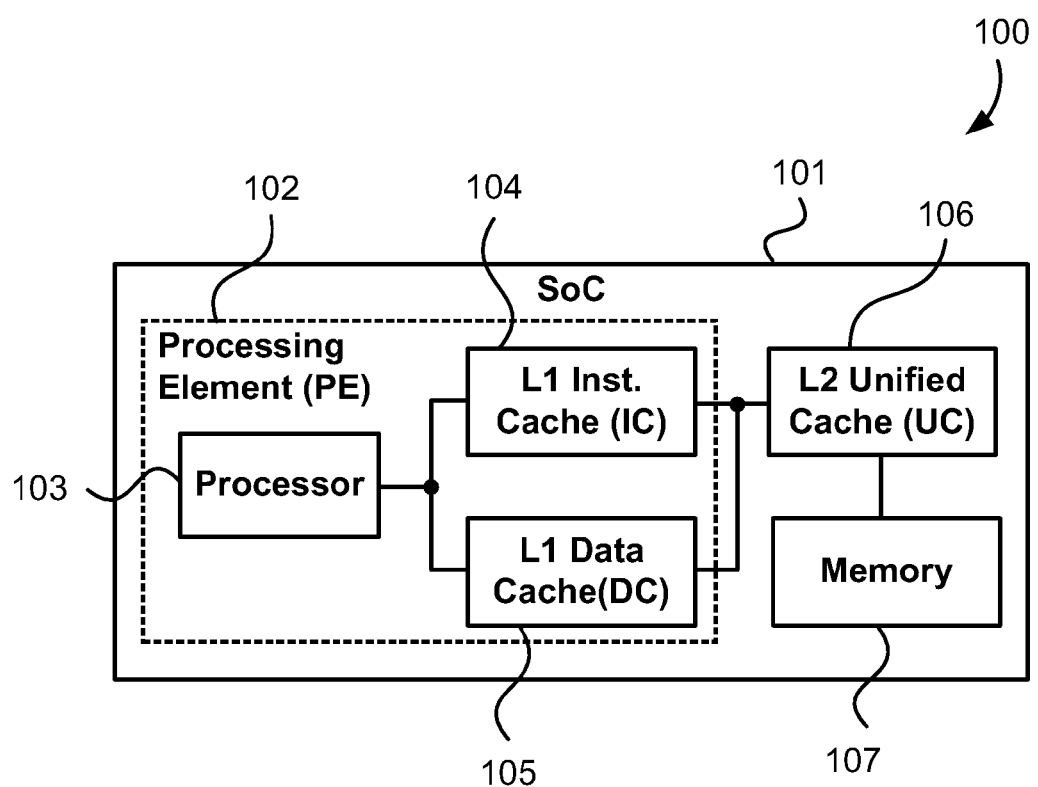
FIG. 1A depicts a typical SoC.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The MESoC arrangement is believed by the inventors to be the first one of its kind for systematic and efficient computation of metrics for parameterized component-based SoCs. The MESoC is a framework for determining metrics of a component-based SoC. It is semi-automated, is applicable to a wide range of architectures with ease, and works with existing design space exploration algorithms. The MESoC arrangement focuses on how to determine metrics of design points systematically and efficiently.

As previously noted, the continuous increase in transistor density has enabled integration of more and more components on a single die. As a result, design complexity is also continuously increasing. As a result, there is a shift towards design automation tools at a system level, particularly mapping of streaming multimedia applications onto SoCs. Design automation at a higher level of abstraction offers the promise of significantly reducing SoC design time and reducing development costs.

As previously noted, an SoC consists of many components, each of which has design parameters such as instruction set architecture of processor, memory/cache size and so on, which makes the design space of the SoC very large. Hence it takes a long time to select a design parameter set to satisfy requirement of a designer. The disclosed MESoC arrangements address this problem to generate a design of a SoC from a very large design space effectively.

Overview of the MESoC Arrangement

The MESoC arrangements use a model dependency graph to capture dependencies between models of components in the SoC hierarchy. The component models can be based on cycle-accurate simulation transaction-level simulation or mathematical models such as linear regression.

The MESoC arrangements exploit dependence between component models in order to maximally, or near-maximally reduce the number of multi-component estimations, which are typically time-consuming when many components are present in the SoC. Accordingly, independence of graph nodes is used to reduce the number of multi-component model executions required in order to determine a specified metric for the SoC in question with respect to a specified objective function. Dependency of graph nodes is used to cluster the components, allowing a designer to substitute multi-component models for the clustered components, thereby reducing problems such as synchronisation which is necessary when simultaneously simulating dependent models.

A necessary and sufficient definition of component dependence/independence is as follows. If an output feature of a first component is used as an input feature of a second component, and an output feature of the second component is used as an input feature of the first component, then the first and second components are inter-dependent. If the dependency is two-way, then the models have to be executed simultaneously. One-way dependencies do not mean simultaneous execution. The term inter-dependent means two-way dependencies and the term dependent means one-way dependencies. Models without any mutual dependencies, either one way or two way, are independent. Models for inter-dependent components must be executed either simultaneously (they cannot be executed separately in the MESoC arrangements because of their inter-dependence) or a suitable multi-component model of the dependent models can be executed instead.

The MESoC approach automatically propagates the outputs of component models using the system dependency graph in order to compute a desired metric (such as performance and power) for the SoC. Thus, the MESoC arrangement supports automation to reduce time-to-design and time-to-market.

Since the MESoC approach does not restrict the design framework to a specific architecture or component estimation model, it is generic enough to be applied to a wide range of architectures and works with existing exploration algorithms.

MESoC Arrangement 1
Overall System

Figure 9:
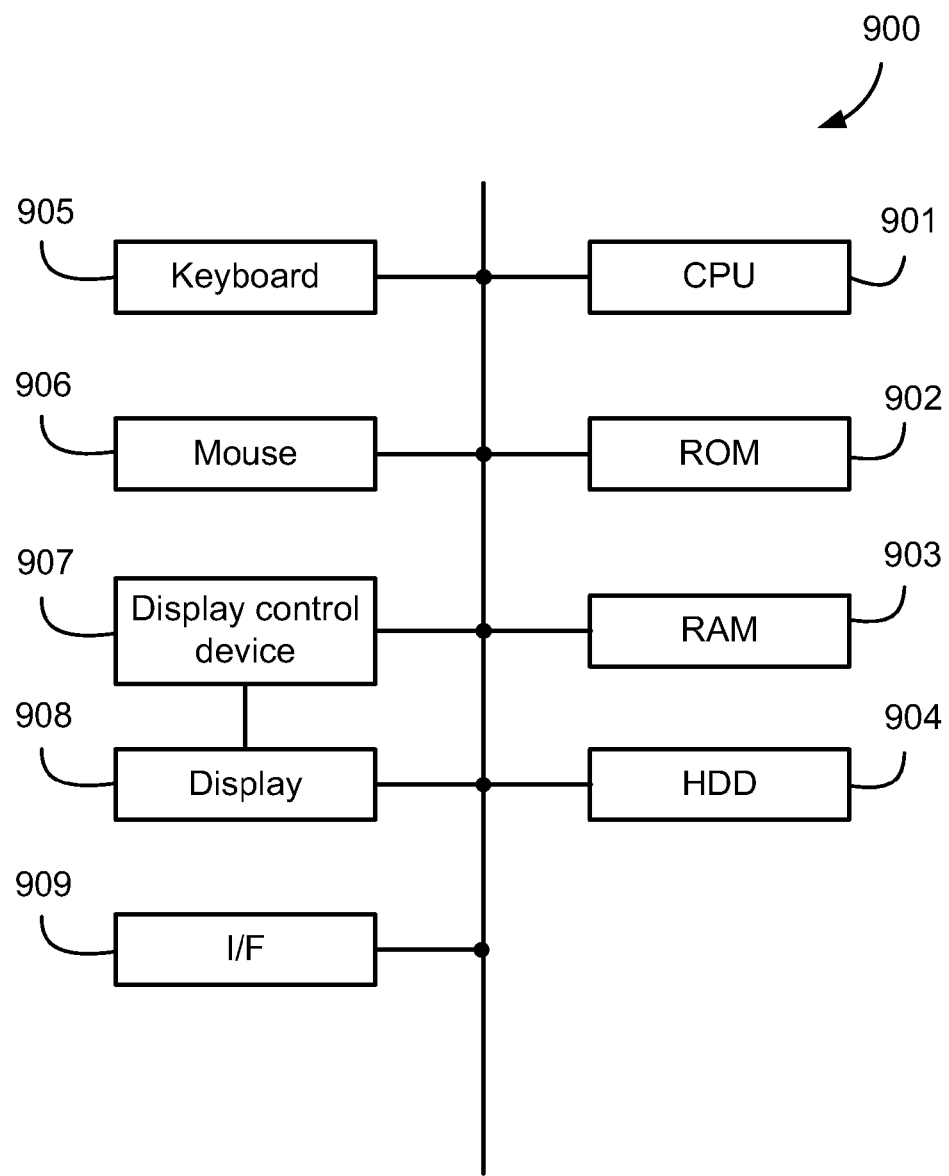
FIG. 9 is a functional block diagram of a general purpose computer on which the disclosed MESoC arrangements.

FIG. 9 depicts a simple functional block diagram of a general purpose computer system 900, described hereinafter in more detail with reference to FIGS. 12A and 12B, for implementing the system 700 for computation of a SoC metric for disclosed MESoC. An element 901 is a CPU for controlling the entire system 900. An element 902 is Read Only Memory (ROM) for storing a boot program/BIOS and an element 903 is Random Access Memory (RAM) which is utilized as a work area for the CPU 901 and for storing an operation system and MESoC software application program. An element 904 is a hard disk drive storing the MESoC software application for implementing the system 700 and for storing various kinds of data. An element 905 and an element 906 are a keyboard and a mouse respectively for providing a user interface. An element 907 is a display control device for storing video memory and a display controller internally. A display 908 can receive a video signal from the display control device 907 and can display the video signal. An element 909 is an interface for communicating with external devices (not shown). In this system 900, once the system powers up the CPU 901 operates the boot program which is stored in the ROM 902. The operating system (OS) which is stored HDD 904 is loaded to the RAM 903. Thereafter, this system 900 operates to determine SoC metrics according to the disclosed MESoC arrangements.

Figure 12A:
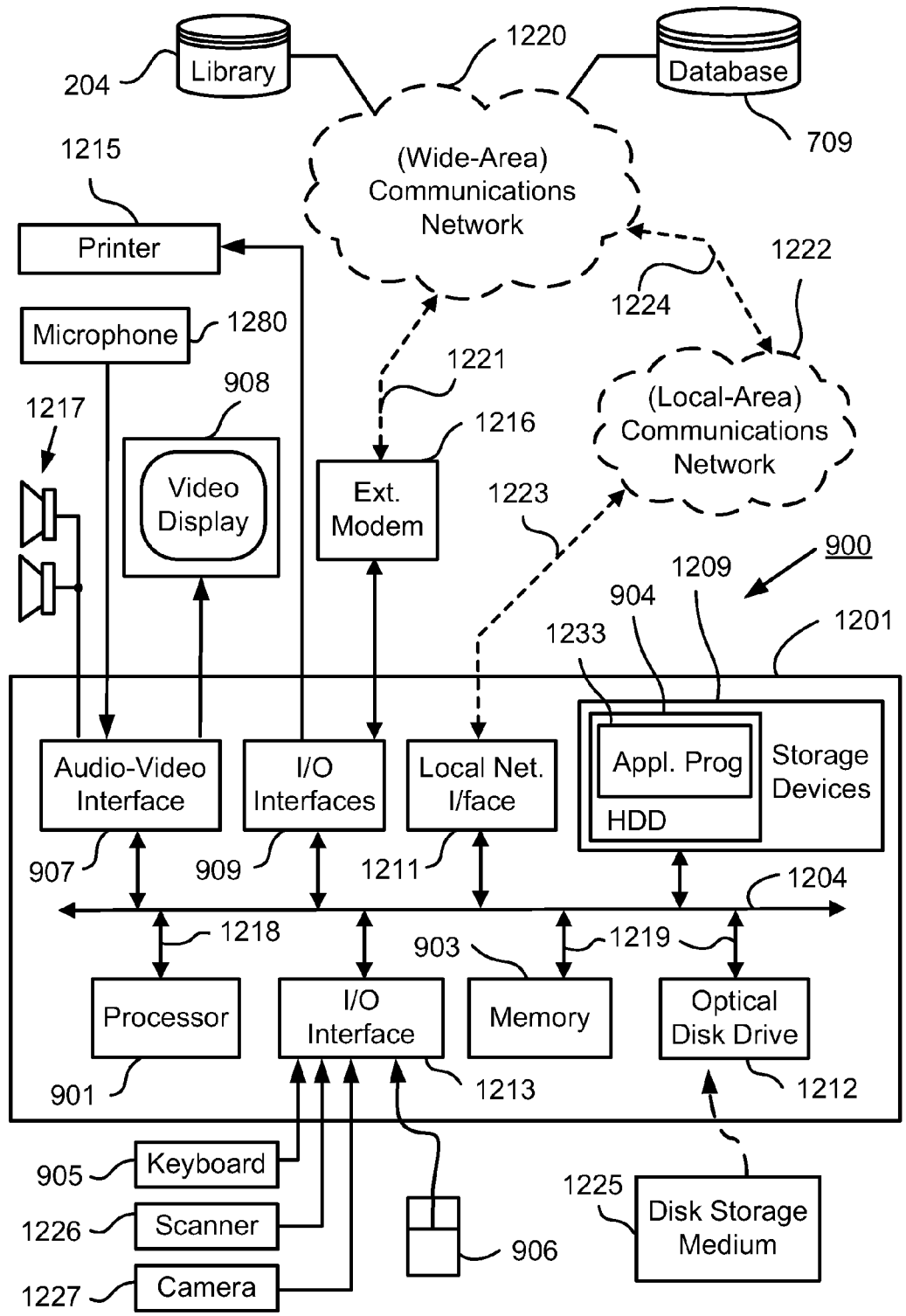
FIGS. 12A and 12B form a more detailed schematic block diagram of a general purpose computer system upon which disclosed MESoC arrangements can be practiced.
Figure 12B:
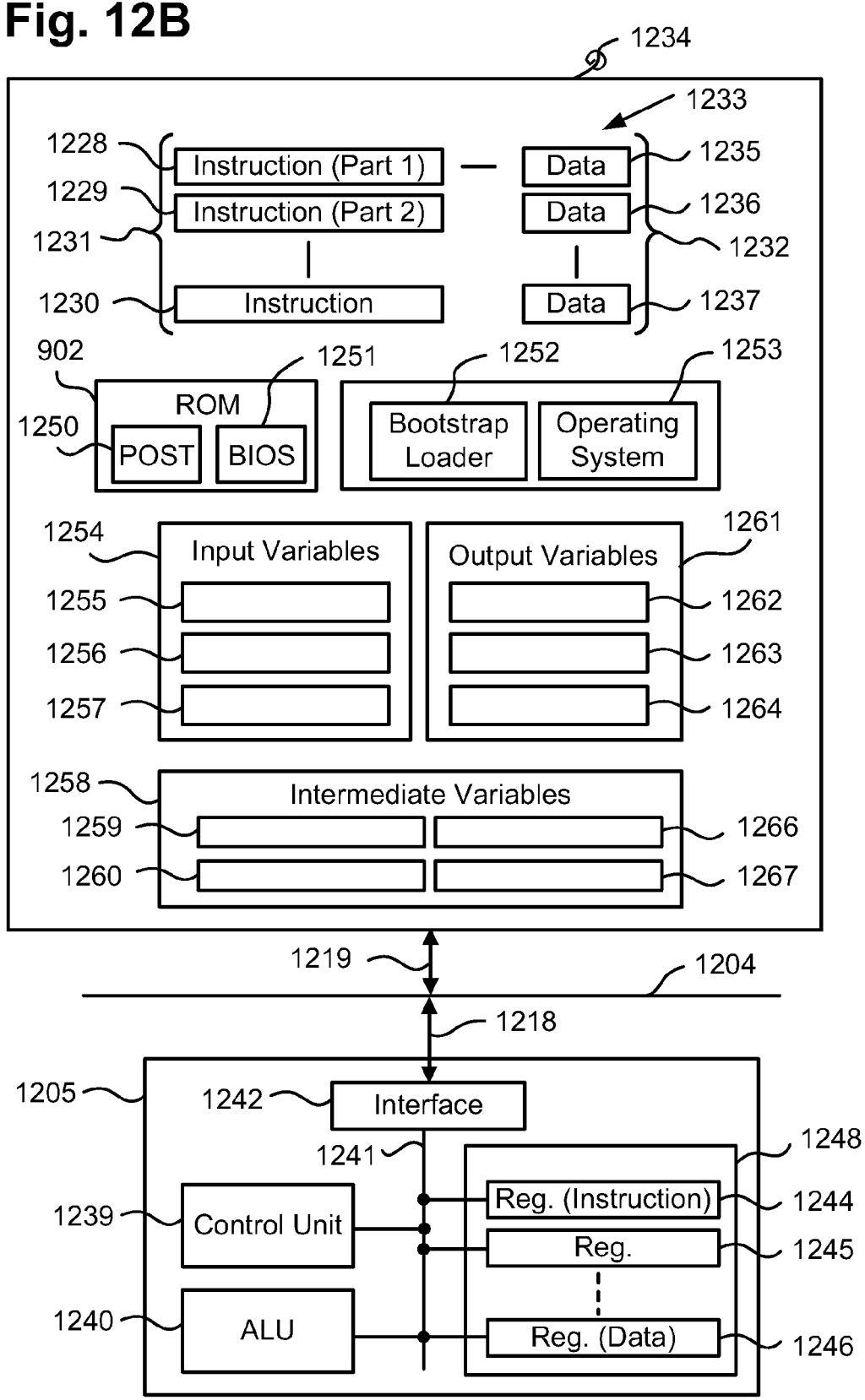

FIGS. 12A and 12B depict the general-purpose computer system 900 in more detail.

As seen in FIG. 12A, the computer system 900 includes: a computer module 1201; input devices such as the keyboard 905, the mouse pointer device 906, a scanner 1226, a camera 1227, and a microphone 1280; and output devices including a printer 1215, the display device 908 and loudspeakers 1217. An external Modulator-Demodulator (Modem) transceiver device 1216 may be used by the computer module 1201 for communicating to and from external devices such as a library 204 and a database 709, described hereinafter in more detail with reference to FIG. 7, over a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the communications network 1220.

The computer module 1201 typically includes at least the one processor unit 901, and the memory unit 903. For example, the memory unit 903 may have semiconductor random access memory (RAM) and semiconductor read only memory (ROM). The computer module 1201 also includes an number of input/output (I/O) interfaces including: an audio-video interface 907 that couples to the video display 908, loudspeakers 1217 and microphone 1280; an I/O interface 1213 that couples to the keyboard 905, mouse 906, scanner 1226, camera 1227 and optionally a joystick or other human interface device (not illustrated); and the interface 909 for the external modem 1216 and printer 1215. In some implementations, the modem 1216 may be incorporated within the computer module 1201, for example within the interface 909. The computer module 1201 also has a local network interface 1211, which permits coupling of the computer system 900 via a connection 1223 to a local-area communications network 1222, known as a Local Area Network (LAN). As illustrated in FIG. 12A, the local communications network 1222 may also couple to the wide network 1220 via a connection 1224, which would typically include a so-called "firewall" device or device of similar functionality. The local network interface 1211 may comprise an Ethernet circuit card, a Bluetooth® wireless arrangement or an IEEE 802.11 wireless arrangement; however, numerous other types of interfaces may be practiced for the interface 1211.

The I/O interfaces 909 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 904. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 900.

The components 901, 1213, 903, 1212, 907, 909, 1211 and 1209 of the computer module 1201 typically communicate via an interconnected bus 1204 and in a manner that results in a conventional mode of operation of the computer system 900 known to those in the relevant art. For example, the processor 901 is coupled to the system bus 1204 using a connection 1218. Likewise, the memory 903 and optical disk drive 1212 are coupled to the system bus 1204 by connections 1219. Examples of computers on which the described arrangements can be practised include IBM-PC's and compatibles, Sun Sparcstations, Apple Mac™ or a like computer systems.

The MESoC methods may be implemented using the computer system 900 wherein the processes of FIGS. 5, 6B 10 and 11 to be described, may be implemented as one or more MESoC software application programs 1233 executable within the computer system 900. In particular, the steps of the MESoC method are effected by instructions 1231 (see FIG. 12B) in the software 1233 that are carried out within the computer system 900. The software instructions 1231 may be formed as one or more code modules, each for performing one or more particular tasks. The software may also be divided into two separate parts, in which a first part and the corresponding code modules performs the MESoC methods and a second part and the corresponding code modules manage a user interface between the first part and the user.

The software may be stored in a computer readable medium, including the storage devices described below, for example. The software is loaded into the computer system 900 from the computer readable medium, and then executed by the computer system 900. A computer readable medium having such software or computer program recorded on the computer readable medium is a computer program product. The use of the computer program product in the computer system 900 preferably effects an advantageous apparatus for performing the MESoC methods.

The MESoC software 1233 is typically stored in the HDD 904 or the memory 903. The software is loaded into the computer system 900 from a computer readable medium, and executed by the computer system 900. Thus, for example, the software 1233 may be stored on an optically readable disk storage medium (e.g., CD-ROM) 1225 that is read by the optical disk drive 1212. A computer readable medium having such software or computer program recorded on it is a computer program product. The use of the computer program product in the computer system 900 preferably affects an apparatus for performing the MESoC methods.

In some instances, the MESoC application programs 1233 may be supplied to the user encoded on one or more CD-ROMs 1225 and read via the corresponding drive 1212, or alternatively may be read by the user from the networks 1220 or 1222. Still further, the software can also be loaded into the computer system 900 from other computer readable media. Computer readable storage media refers to any non-transitory tangible storage medium that provides recorded instructions and/or data to the computer system 900 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the MESoC application programs 1233 and the corresponding code modules mentioned above may be executed to implement one or more graphical user interfaces (GUIs) to be rendered or otherwise represented upon the display 908. Through manipulation of typically the keyboard 905 and the mouse 906, a user of the computer system 900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 12B is a detailed schematic block diagram of the processor 901 and a "memory" 1234. The memory 1234 represents a logical aggregation of all the memory modules (including the HDD 1209 and semiconductor memory 903) that can be accessed by the computer module 1201 in FIG. 12A.

When the computer module 1201 is initially powered up, a power-on self-test (POST) program 1250 executes. The POST program 1250 is typically stored in a ROM 902 of the semiconductor memory 903 of FIG. 12A. A hardware device such as the ROM 902 storing software is sometimes referred to as firmware. The POST program 1250 examines hardware within the computer module 1201 to ensure proper functioning and typically checks the processor 901, the memory 1234 (1209, 903), and a basic input-output systems software (BIOS) module 1251, also typically stored in the ROM 902, for correct operation. Once the POST program 1250 has run successfully, the BIOS 1251 activates the hard disk drive 904 of FIG. 12A. Activation of the hard disk drive 904 causes a bootstrap loader program 1252 that is resident on the hard disk drive 904 to execute via the processor 901. This loads an operating system 1253 into the RAM memory 903, upon which the operating system 1253 commences operation. The operating system 1253 is a system level application, executable by the processor 901, to fulfil various high level functions, including processor management, memory management, device management, storage management, software application interface, and generic user interface.

The operating system 1253 manages the memory 1234 (1209, 903) to ensure that each process or application running on the computer module 1201 has sufficient memory in which to execute without colliding with memory allocated to another process. Furthermore, the different types of memory available in the system 900 of FIG. 12A must be used properly so that each process can run effectively. Accordingly, the aggregated memory 1234 is not intended to illustrate how particular segments of memory are allocated (unless otherwise stated), but rather to provide a general view of the memory accessible by the computer system 900 and how such is used.

As shown in FIG. 12B, the processor 901 includes a number of functional modules including a control unit 1239, an arithmetic logic unit (ALU) 1240, and a local or internal memory 1248, sometimes called a cache memory. The cache memory 1248 typically include a number of storage registers 1244-1246 in a register section. One or more internal busses 1241 functionally interconnect these functional modules. The processor 901 typically also has one or more interfaces 1242 for communicating with external devices via the system bus 1204, using a connection 1218. The memory 1234 is coupled to the bus 1204 using a connection 1219.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228, 1229, 1230 and 1235, 1236, 1237, respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228 and 1229.

In general, the processor 901 is given a set of instructions which are executed therein. The processor 1105 waits for a subsequent input, to which the processor 901 reacts to by executing another set of instructions. Each input may be provided from one or more of a number of sources, including data generated by one or more of the input devices 905, 906, data received from an external source across one of the networks 1220, 905, data retrieved from one of the storage devices 903, 1209 or data retrieved from a storage medium 1225 inserted into the corresponding reader 1212, all depicted in FIG. 12A. The execution of a set of the instructions may in some cases result in output of data. Execution may also involve storing data or variables to the memory 1234.

The disclosed MESoC arrangements use input variables 1254, which are stored in the memory 1234 in corresponding memory locations 1255, 1256, 1257. The MESoC arrangements produce output variables 1261, which are stored in the memory 1234 in corresponding memory locations 1262, 1263, 1264. Intermediate variables 1258 may be stored in memory locations 1259, 1260, 1266 and 1267.

Referring to the processor 901 of FIG. 12B, the registers 1244, 1245, 1246, the arithmetic logic unit (ALU) 1240, and the control unit 1239 work together to perform sequences of micro-operations needed to perform "fetch, decode, and execute" cycles for every instruction in the instruction set making up the program 1233. Each fetch, decode, and execute cycle comprises:

a fetch operation, which fetches or reads an instruction 1231 from a memory location 1228, 1229, 1230;

a decode operation in which the control unit 1239 determines which instruction has been fetched; and an execute operation in which the control unit 1239 and/or the ALU 1240 execute the instruction.

Thereafter, a further fetch, decode, and execute cycle for the next instruction may be executed. Similarly, a store cycle may be performed by which the control unit 1239 stores or writes a value to a memory location 1232.

Each step or sub-process in the processes of FIGS. 5, 6B 10 and 11 is associated with one or more segments of the program 1233 and is performed by the register section 1244, 1245, 1247, the ALU 1240, and the control unit 1239 in the processor 901 working together to perform the fetch, decode, and execute cycles for every instruction in the instruction set for the noted segments of the program 1233.

The MESoC methods may alternatively be implemented in dedicated hardware such as one or more integrated circuits performing the MESoC functions or sub functions. Such dedicated hardware may include graphic processors, digital signal processors, or one or more microprocessors and associated memories.

Preliminaries

The SoC

The disclosed MESoC arrangements are used in relation to SoCs that are designed/created hierarchically from components. At a top level, the SoC itself is considered to be a component that consists of several sub-components. These sub-components can themselves contain further sub-components, thereby adding another level to the hierarchy. The components that do not contain any sub-components are referred to as "leaf components". A component can either be non-parameterized or parameterized meaning that the component has a number of parameters associated with it, where each parameter can assume one of a number of possible values. For example, a cache can have various design parameters such as size, line size, associativity etc for data cache/instruction cache and a size for local memory, and instruction set architecture and custom instruction for the processing core. If a design is to be parameterised with respect to the above design parameters, a designer generates actual component specifications according to a system request during a system integration/implementation phase.

A parameterized leaf component has a number of parameters associated with it. Each parameter can assume one of a number of possible values. A complete assignment of values to all the parameters is referred to as a specific "configuration" of the component. The universe of all the possible combinations of parameter values (ie configurations) for the leaf component is the design space of the leaf component.

The design space of a non-leaf (intermediate) component is a cross-product of its self-configurations (resulting from all the values of its own parameters) and the design spaces of its sub-components, as described hereinafter in more detail with reference to FIG. 1B.

At the top level, the design space of the SoC itself is the cross-product of all the parameter values (configurations) of its parameterized components. The terms "configuration" and "design point" are used interchangeably in the remainder of this specification.

FIG. 1A depicts a typical SoC 101. The SoC 101 has one processor 103, an L1 instruction cache 104 and a data cache 105, a unified L2 cache 106 and a memory 107. Note that this example is chosen for the sake of example to illustrate the application of the disclosed MESoC arrangements. The SoC 100 is thus made up of three sub-components, namely a processing element 102, the L2 cache 106 and the memory 107. The processing element 102 is made up of three sub-components, namely the processor, the L1 instruction cache 104 and the L1 data cache 105.

Figure 1B:
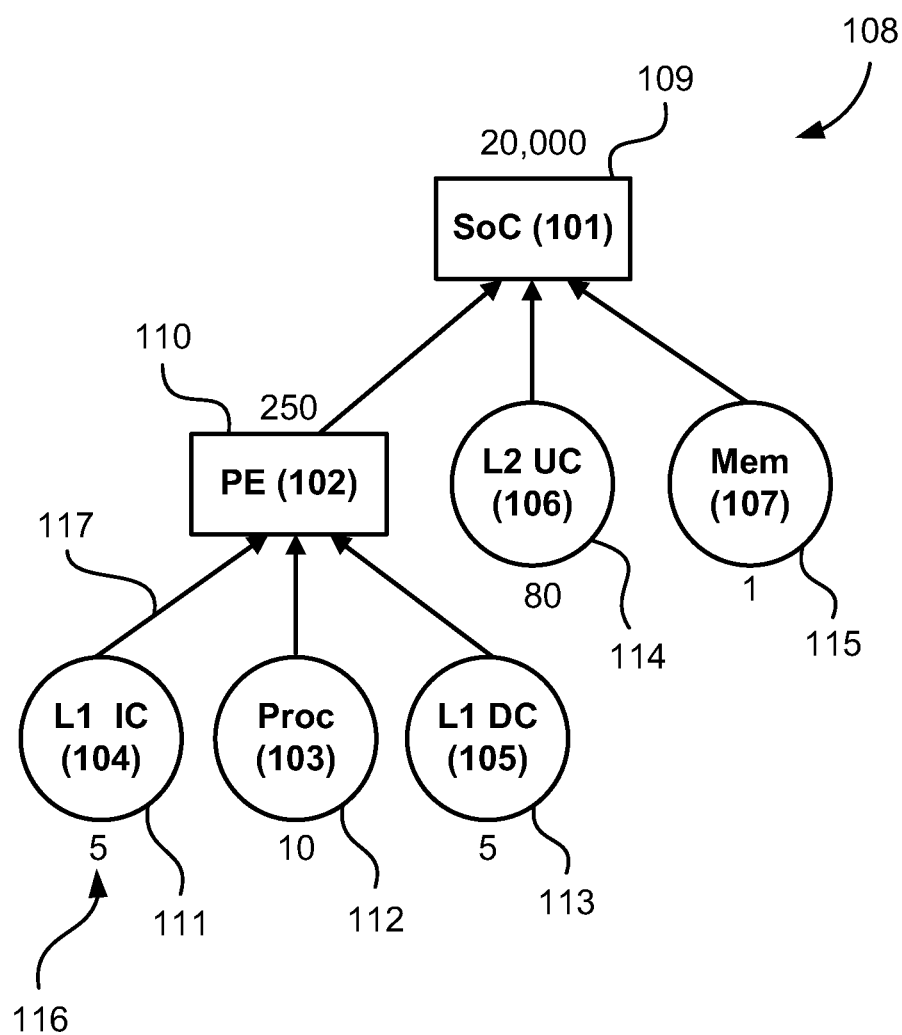
FIG. 1B is a hierarchical description of a typical SoC.

FIG. 1B illustrates a hierarchy 108 of the SoC 101. Non-leaf nodes 109, 110 and leaf nodes 111, 112, 113, 114, 115 (corresponding to respective components 101, 102, 104, 103, 105, 106 and 107) are drawn respectively using rectangle and circle symbols. Each symbol contains a label (eg "SoC") and a reference numeral (eg (101)) corresponding to the reference labels and numerals in FIG. 1A. In this specification, the term "node" represents a "component" in the hierarchy of a SoC, and the "model" associated with the component". Thus, the terms "components", "nodes" (of a graph), and "models" (of the components) are used interchangeably unless specifically noted to the contrary.

In this example, it is assumed that the processor 103, the L1 instruction cache 104 and the L1 data cache 105, and the L2 cache 106 are parameterized components. This is indicated by numerals located below the symbols, such as a numeral "5" which indicates that the L1 instruction cache 104, represented by the circle symbol 111, can assume one of five possible configurations in the final SoC design. The processor 103 has 10 possible configurations due to the availability of custom instructions and functional units. The L1 instruction cache 104 and L2 caches 106 are configurable in their size, line size and associativity with a total of 5 configurations for each of L1 instruction 104 and data caches 105. There are 80 available configurations for the L2 cache 106. Each component representation in FIG. 1B is annotated with a numeral such as 116 indicating the size of the design space of the associated component. Thus, for example, the component 104 represented by the node 111 is characterised by a set of parameters which can assume any one of five values, and thus the design space of the component 104 has 5 points. The processing element 102 (depicted by the component representation 110 in FIG. 1B) has 250 design points, which is a result of the cross-product of its sub-components' individual design spaces. More particularly, the leaf sub-components 104, 103 and 105 have 5, 10 and 5 respective design points, which, when multiplied together, give the 250 design points associated with the non-leaf component 102. At the top-level, the SoC (ie 101) has a total of 20,000 design points. Typically, changing values of parameters of a component changes its metrics such as performance and power. For example, changing "size" parameter of a cache will affect its hits and misses. Thus, at a top-level, the design points of a SoC represent the universe of its possible configurations that trade-off its associated metrics, and one of the configurations is selected for final implementation of the SoC.

Library.

The target SoC 101 described above can, in general, contain any number of non-parameterized and parameterized components, and levels in the hierarchy. The use of hierarchically connected parameterized components is a well-known design methodology, and allows design and verification of individual components, design reuse, and optimization of the SoC. Hence the MESoC arrangement considers availability of a library 204 of components, described hereinafter in more detail with reference to FIG. 7, for creation of the SoCs. Each component in the library 204 is associated with a number of models that represent a behaviour of the component at particular abstraction layers. The component models can be defined using, for example, a database description language such as the XML-based IP-XACT which is a standard format of the SPIRIT Consortium which is a group of vendors and users of electronic design automation (EDA) tools, defining standards for the exchange of System-on-a-chip (SoC) design information. The MESoC arrangements are not, however, limited to the use of IP-XACT.

In the MESoC arrangements there can be multiple models for a component at the same or different abstraction layers with varying accuracies and execution times. A cycle-accurate simulator can be implemented as a computer program that simulates a micro-architecture on a cycle-by-cycle basis. A transaction-level simulator uses a high-level approach to modelling digital systems where details of communication among modules are separated from the details of the implementation of functional units or of the communication architecture. An analytical model is a description of a system using mathematical concepts and language. In one of the MESoC arrangements, a processor model in the library 204 is based upon a cycle-accurate simulator, a transaction-level simulator and an analytical model, resulting in three different models at three abstraction layers The three abstraction layers are cycle-accurate, transaction level and analytical level layers. The MESoC arrangements are not however restricted to three abstraction layers.

In one MESoC arrangement, in order to enable systematic utilization of the models, the present MESoC arrangements typically use an abstraction in which the interface of a model consists of input and output features (related to the component), where the input features are transformed to the output features by the internal implementation of the model. The input features are typically based upon the parameters associated with the component and/or output features of models of other components. For example, input features of a trace-based model of the L2 cache 106 in the SoC 101 are the cache size, line size, associativity, and trace (from execution of the models for the L1 caches 104, 105). A trace-based model uses a trace of memory requests to model the behaviour of caches/memory. The output features are an estimated value of read hits and misses, and write hits and misses from the abstract model of the memory. Thus, the model of a component can be executed for a given design point to gather the output features of the model. It is noted that the output features may be accurately determined, or alternately, may be an estimate only, depending upon the model. For example, a cycle-accurate model will provide accurate execution time in clock cycles while a transaction level model will provide an estimate of the clock cycles. The use of abstract interface of input and output features means that component models that are at different abstraction layers may be systematically/automatically used from the library by the MESoC system. The interfaces of the models used in the MESoC arrangements are thus typically designed for interoperability between the models.

In addition to the models of individual components, flat/combined models of multiple components (multi-component models) are available in the library 204 when metrics of those components need to be computed together due to their complex interplay. For example, accurate calculation of access latency for every memory request should use a combined cycle-accurate model of the caches and DRAM memory due to the complex nature of DRAM.

Design Space Estimation and Exploration Framework.

Figure 2:
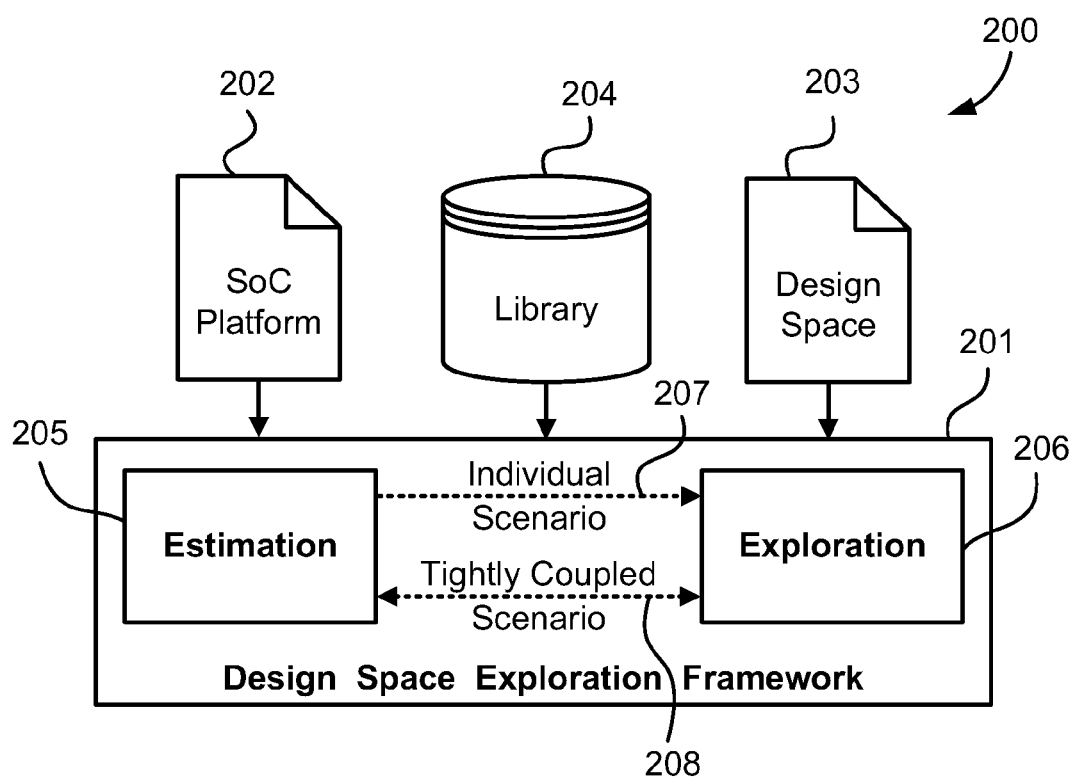
FIG. 2 is a functional block diagram of a design space estimation and exploration system.

FIG. 2 is a functional block diagram 200 of a design space estimation and exploration system 201 where MESoC arrangements could be used. FIG. 2 shows an overall system 200 of a typical design space estimation and exploration framework 201, which takes an SoC specification 202 as an input, which is the specification of the desired SoC, its design space (design parameters) 203 and a library of components 204. Operation of the design space estimation and exploration system 201 occurs in two phases, namely an estimation phase 205, described hereinafter in more detail with reference to FIG. 7, and an exploration phase 206, described hereinafter in more detail with reference to FIG. 7. The estimation phase 205 provides, to the exploration phase 206, accurate values or estimates of metrics for design points for the specified SoC. The exploration phase 206 then searches through those design points for an optimal or near-optimal design point.

In some design space estimation and exploration systems, the estimation phase 205 and the exploration phase 206 are used individually, that is, the estimation phase 205 first computes the estimates of metrics for all the design points, and then the exploration phase 206 uses those estimates to search through the design space. This is referred to as an "individual scenario" 207. In other design space estimation and exploration systems, these phases are tightly coupled with each other, where the exploration phase 206 queries the estimation phase 205 while exploring the design space rather than having all the estimates ready beforehand. This is referred to as a "tightly coupled" scenario 208. The MESoC arrangements can utilise existing exploration algorithms (in the exploration phase 206) using either the individual scenario 207 and/or the tightly coupled scenario 208.

Problem Statement.

A component-based SoC, composed of numerous interconnected non-parameterized and parameterized components from the library 204, is specified in the SoC specification 202. Each component in the SoC is associated with one of the models available for it in the library 204. The goal of the MESoC arrangement is to determine the metrics (such as performance and power) of a single or multiple design points of the SoC with a minimal number of executions of the models from the library 204, which is equivalent to computation of the metrics as quickly as possible.

A naive and exhaustive solution is to execute a "flat" model of the proposed SoC, where all the SoC components are modelled on the same layer and there is no use of a hierarchal structure. In this approach all the SoC components (each typically modelled using a cycle-accurate simulator) are used to characterise each SoC design point in order to determine the required metrics such as performance and power consumption. In a flat model, metrics can be only estimated by considering all component models together, rather than the step-by-step approach that can be used in a hierarchal approach. Such an approach is thus likely to be impractical for SoCs with large numbers of components because execution of the flat SoC model for even a single design point is very time consuming due to the high complexity of the SoC.

Framework

Model Dependency Graph.

In a component-based SoC, dependencies exist between some component models, while other component models are independent of each other.

This can be understood by considering the following example from FIG. 2B. If the models of the L1 instruction cache 104 and the L1 data cache 105 were considered, for the sake of example, to be dependent, each having a component design space of 5 as depicted by their respective indices such as 116, then a combined model of the two components would be required and 5×5=25 (cross-product of their respective design spaces) executions of the combined model would be required. On the other hand if, for the sake of example, these models are independent, then the component models can be executed independently and only 5+5=10 individual model executions are required.

It is also noted that one execution of the combined model would take longer than the independent execution of the individual models because a model of a single component such as a cache is typically less complex than a combined model of two caches. That is to say, combined modelling of multiple components typically requires modelling of their interactions as well as their individual behaviours, which are often complex. This increases the time-complexity of combined models. Therefore, the benefit of independent component models is not only in reduction of the number of model executions but also reduction of the time required for a single execution.

The present MESoC arrangement exploits above described independence of the component models for increasing the number of individual component models that are executed in determining the desired metric of a particular SoC, which is equivalent to maximally reducing the number of multi-component models that are executed in determining the desired metric of the particular SoC in question. This leads to reduction in overall time for computation of a desired metric for the whole or a part of the design space in question.

In the MESoC arrangements a directed graph is used to capture the dependencies between component models in the SoC. A directed graph is a graph, or set of nodes connected by edges, where the edges have a direction associated with them. A node in the graph (such as 111 in FIG. 1B) represents a component 104 (and its associated model) while a directed edge (such as 117 in FIG. 1B) that links two nodes represents a dependency between the nodes in terms of node features. Edges can have a single direction, where the component at the arrow head of the edge is dependent upon the component at the tail of the arrow. Alternately, edges can be bidirectional (the MESoC arrangements typically use a pair of opposed edges instead of bidirectional edges), indicating that a component at a first arrow head is dependent upon the component at the other arrow head, and vice versa. Considering the single direction edge 117 from the node 111 to the node 110, this means that the processing element 102 requires, as an input, an output of the L1 instruction cache 104.

Figures 3A, 3B:
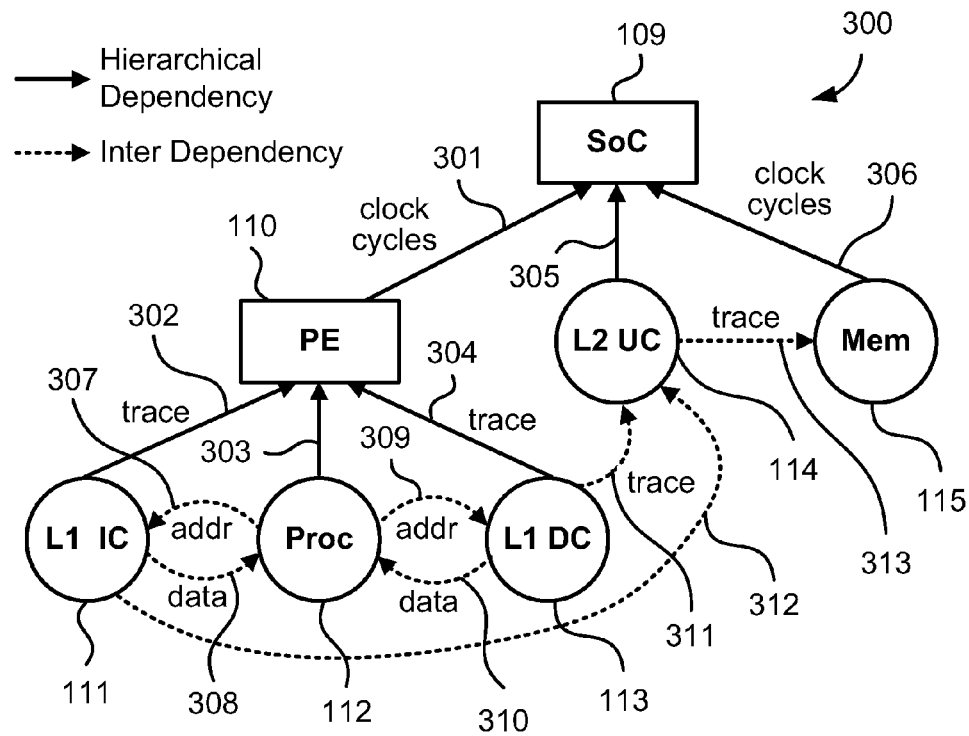
FIGS. 3A and 3B are respectively a model dependency graph for the SoC of FIG. 1, and a legend identifying the model type for the nodes in the graph.

FIG. 3A is a model dependency graph for the SoC 101 of FIG. 1A. An edge 309 from a node 112 as node u to node 113 as node v means that one or more output features of a model associated with u are used as input features for the model associated with v as shown in FIG. 3A. In other words, the model of v is dependent on the model of u. It is possible as previously noted for the two models u and v to be dependent on each other. That is, u uses output features of v while v uses output features of u. Generalizing this definition, two models u and v are considered one-way dependent if there is a path from u to v or from v to u in the model dependency graph. Two models u and v are considered two-way dependent, or inter-dependent, if there is a path from u to v and from v to u in the model dependency graph. Two models u and v are considered independent if there is no path between them in the model dependency graph. This means that node v cannot be reached when a traversal is started at node u in the model dependency graph. Inter-dependent models, ie linked by bi-directional edges, need to be executed simultaneously.

A dependency between two component models is categorized as either a hierarchical dependency, such as a solid line 302 which represents output of trace variables from the node 111 to the node 110 or an inter-dependency such as dashed line 307 from node 111 to node 112 shown in FIG. 3A. The hierarchical dependency is between a component and its sub-components, that is, between parent and child. On the other hand, an inter dependency is between any two components not having a parent-child relationship. In the disclosed MESoC arrangement, dependencies between component models are assumed to be specified by the designer in the SoC specification 202. Hierarchical dependencies follow directly from the hierarchical description 202 of the SoC, and thus can be extracted automatically. Inter-dependencies often follow from the interconnection of the components and the abstraction layer of the models. For example, in FIG. 1A, if a trace-based model is used for the L2 cache 106, then the trace output by the models of the L1 instruction cache 104 and/or the L1 Data cache 105 will be used as an input to the model of L2 cache 106. Inter-dependencies do not always follow from the interconnection as sometimes two components that are not directly connected to each other in the SoC can have an interdependency based upon the models associated with them.

In some MESoC arrangements, the SoC specification takes a form depicted in FIG. 1A which is parsed, as described hereinafter in more detail with reference to FIG. 7, to form an associated model dependency graph as depicted in FIG. 3A. In other MESoC arrangements, the designer provides the SoC specification 220 directly in the form of the model dependency graph of FIG. 3A. The model interfaces in the SoC specification 202 are typically standardised so that component models at different abstraction layers can be systematically/automatically used from the library by the MESoC arrangement. In typical MESoC arrangements, an IP-XACT based format is used for specification of the SoC 202, which comprises of (a) SoC components, (b) models for its components, and (c) dependencies between those component models. IP-XACT is the leading industry standard for flexible specification of component-based SoCs and creation of scalable frameworks comprising components and tools from various vendors. This framework uses the vendor extensions in IP-XACT to specify models for the components and their dependencies. The output of one component model should, in the SoC specification 202, be compatible with the input of the other component model. For example, if a processor model generates a trace, then the cache model should accept the trace as an input. This MESoC arrangement assumes that the designer of the SoC ensures, in the SoC specification 202, that component models are compatible with each other when there is a dependency. For example, a trace-based model for the L2 cache 106 and a cycle-accurate model for the memory 107 need to be compatible as the model of the L2 cache 106 needs to produce memory addresses and accept data returned by the memory model 107. The detection of compatibility issues may be automated by comparing outputs and inputs of connected models.

In one example, the MESoC arrangement takes the input specification of the SoC 101 as shown in FIG. 1A and creates a model dependency graph 300 shown in FIG. 3A. At the bottom level, a cycle-accurate processor model 112 generates a trace 303 of its execution while cycle-accurate models of the L1 instruction cache 111 and the data cache 113 produce traces of hits 302 and 304, and misses 311 and 312. An analytical model of the processing element 110 uses these traces 302, 303 and 304 to compute clock cycles 301 spent in the processor 112 and both L1 instruction cache 111 and data cache 113. The traces of misses 311 and 312 from both the L1 instruction cache 111 and the data cache 113 is used by the trace-based model of the L2 cache 114 to compute the clock cycles 305 spent in the L2 cache 114. The trace-based memory model 115 uses the misses 313 from the model of the L2 cache 114 to output the clock cycles 306 for all the requests coming to the trace-based memory model. At the top level, the SoC 109 analytical model sums these clock cycles to compute the total execution time of the SoC 109 which in this example is the desired metric. This example shows how component models at different abstraction layers interact and are executed to compute the desired metric for the top level. A designer can exploit this heterogeneity to use complex, more accurate models for critical components, while using simpler, less accurate models for non-critical components of a SoC.

Dependencies Based Clustering.

If two component models depend on each other, that is, if there is an edge from u to v and/or from v to u in the model dependency graph, then those models cannot be executed independently. This is because u uses output features of v and/or v uses output features of u, which points to the fact that these two models must be executed simultaneously. Additionally, the multi-component model of u and v must typically be executed for all the design points in the cross-product of their individual design spaces, with no reduction in execution time.

Figure 4A:
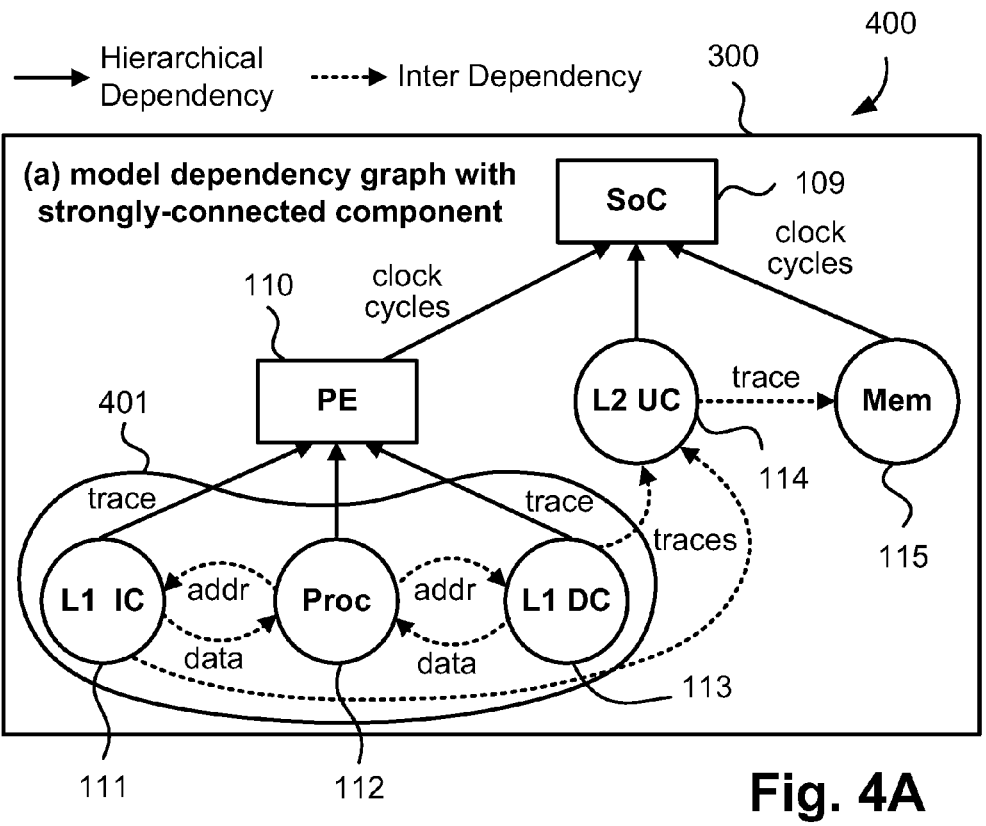
FIGS. 4A-4C form an example of clustering of the model dependency graph of FIG. 3A.
Figure 4B:
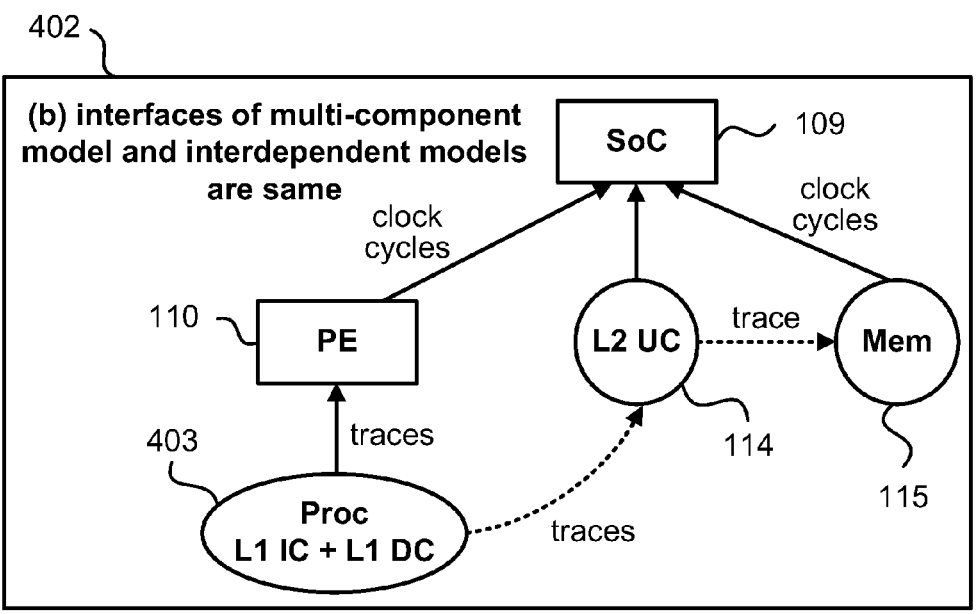
Figure 4C:
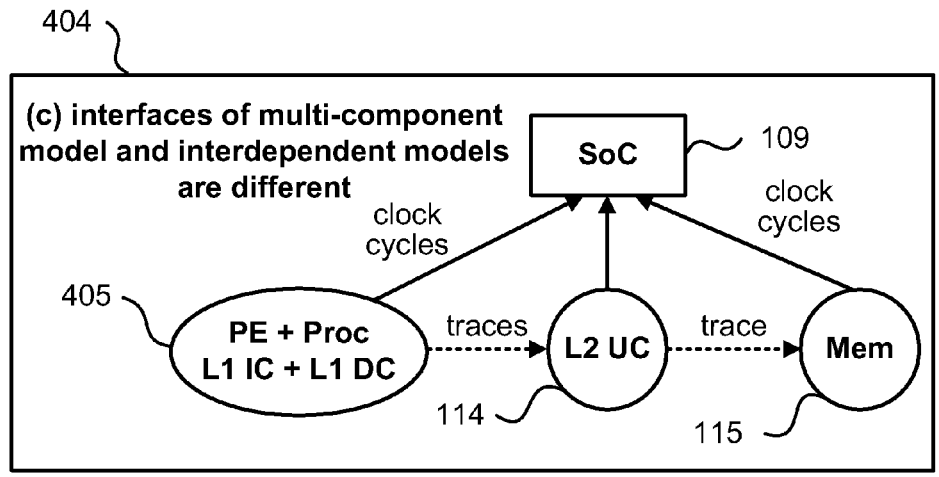

FIGS. 4A-4C form an example of clustering of the model dependency graph. In FIG. 4A, the models of the processor 112 and the L1 instruction cache 111 and the L1 data cache 113 are dependent on each other, as depicted by the interdependencies 307, 308, 309 and 310. L1 instruction cache model 111 and L1 data cache model 113 are dependent because there is a path consisting of edges 308 and 309 from node 111 to node 113 through node 112. This means that a multi-component model 401 of the processor 112 with the L1 instruction cache 111 and the L1 data cache 113 should be used for 250 design points (10 processor configurations, and 5 instruction and 5 data cache configurations). Therefore, this MESoC example clusters the interdependent nodes 111, 112 and 113 into a single node 401. The term interdependent means strongly connected, as described above. The MESoC example associates a combined multi-component model with the clustered single node 401, this model being derived either from the library 204, or derived from another library or custom analysis of the clustered component model 401. In other words, the SoC specification 202 in this example specifies the three components and their models and associated data namely the processor 112, the L1 instruction cache 111 and the L1 data cache 113. The MESoC arrangement determines that these three components are interdependent, and that consequently a combined multi-component model is required to replace the three individual components. The MESoC arrangement acquires this multi-component model either from the library 204, or from another available library (available over the network 1220), or it requests a clustered component model 401 from the system operator.

The problem of finding all sets of interdependent component models is equivalent to finding all the strongly-connected components of a directed graph. A directed graph is called strongly connected if there is a path in each direction between each pair of nodes of the graph. A strongly-connected component of a directed graph is defined to be a maximal set of nodes such that for each pair of nodes u and v, there is a path from u to v and from v to u. The strongly-connected components of a directed graph can be found in linear time using one of the existing algorithms such as Tarjan's Algorithm. Once interdependent component models are identified, the MESoC arrangement clusters the interdependent component models to generate a combined multicomponent model for each set of interdependent single component models. Two cases are possible during such clustering:

Either

I. The interface of the multi-component model is exactly equivalent to the aggregated interfaces of the individual component models. In this case, the multi-component model will be a perfect replacement, and the MESoC arrangement clusters the interdependent nodes and substitutes a corresponding multi-component model for the clustered node comprising a cluster of the individual component models. For example, in FIG. 4B, if the interface of the multicomponent model 403 of the processor 112 and the L1 instruction cache 111 and the L1 data cache 113 will produce exactly three cache traces 302, 303 and 304 as done by the individual component models, as shown in 402, then the processor 112 and the L1 instruction cache 111 and the L1 data cache 113 are clustered into the single multi-component model 403 without any modifications to the dependencies in the neighbourhood, retaining the parent processing element model 110 in the clustered model dependency graph 402.

Or

II. The interface of the multi-component model 405 is different from the aggregated interfaces of the individual component models of the processor 112 and the L1 instruction cache 111 and the L1 data cache 113. This means that the multi-component model may, for example, include modelling of some of the parent components of the interdependent nodes, and the dependencies in the neighbourhood will likely change. For example, in FIG. 4C, if the interface of the multi-component model 405 of the processor 112 and the L1 instruction cache 111 and the L1 data cache 113 will produce clock cycles 301 (rather than the three traces 302, 303 and 304 as done by the individual component models 111, 112 and 113), then the model 110 of the processing element 110 is not required. In this case, models of the parent processing element 110, the processor 112, the L1 instruction cache 111 and the L1 data cache 113 are clustered into a single multi-component model 405 as shown in 404. Complete automation of clustering of nodes including a strongly-connected component is a challenging task. Therefore, the MESoC arrangements highlight the strongly-connected component and its parents in a graphical representation to the MESoC operator/designer, and asks the designer to guide the MESoC arrangement by selecting which parent should be clustered as well.

Figure 7:
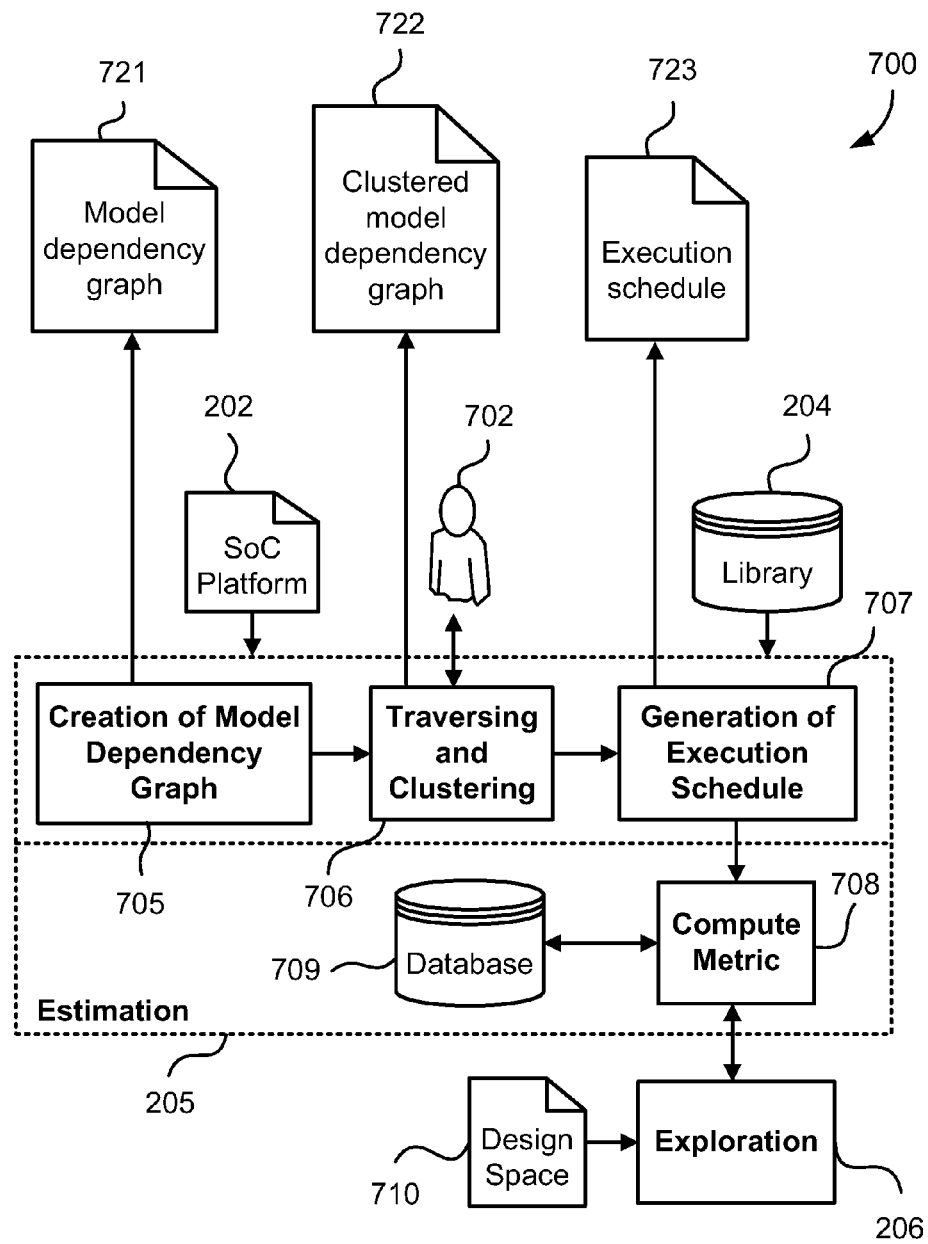
FIG. 7 is a functional block diagram of a system for determination of a SoC metric for disclosed MESoC arrangements.

Once the clustering is done, the model dependency graph (such as 721 in FIG. 7) is modified by substitution of the multi-component models for the strongly connected individual component models to form a clustered model dependency graph (such as 722 in FIG. 7). The clustered model dependency graph is an acyclic directed graph, ready for automatic generation of an execution schedule for the component models according to an MESoC method described below. A directed acyclic graph is a directed graph formed by a collection of nodes and directed edges, each edge connecting one node to another, such that there is no way to start at some node v and follow a sequence of edges that eventually loops back to v again. In other words, there are no cycles in the directed graph.

Figure 11:
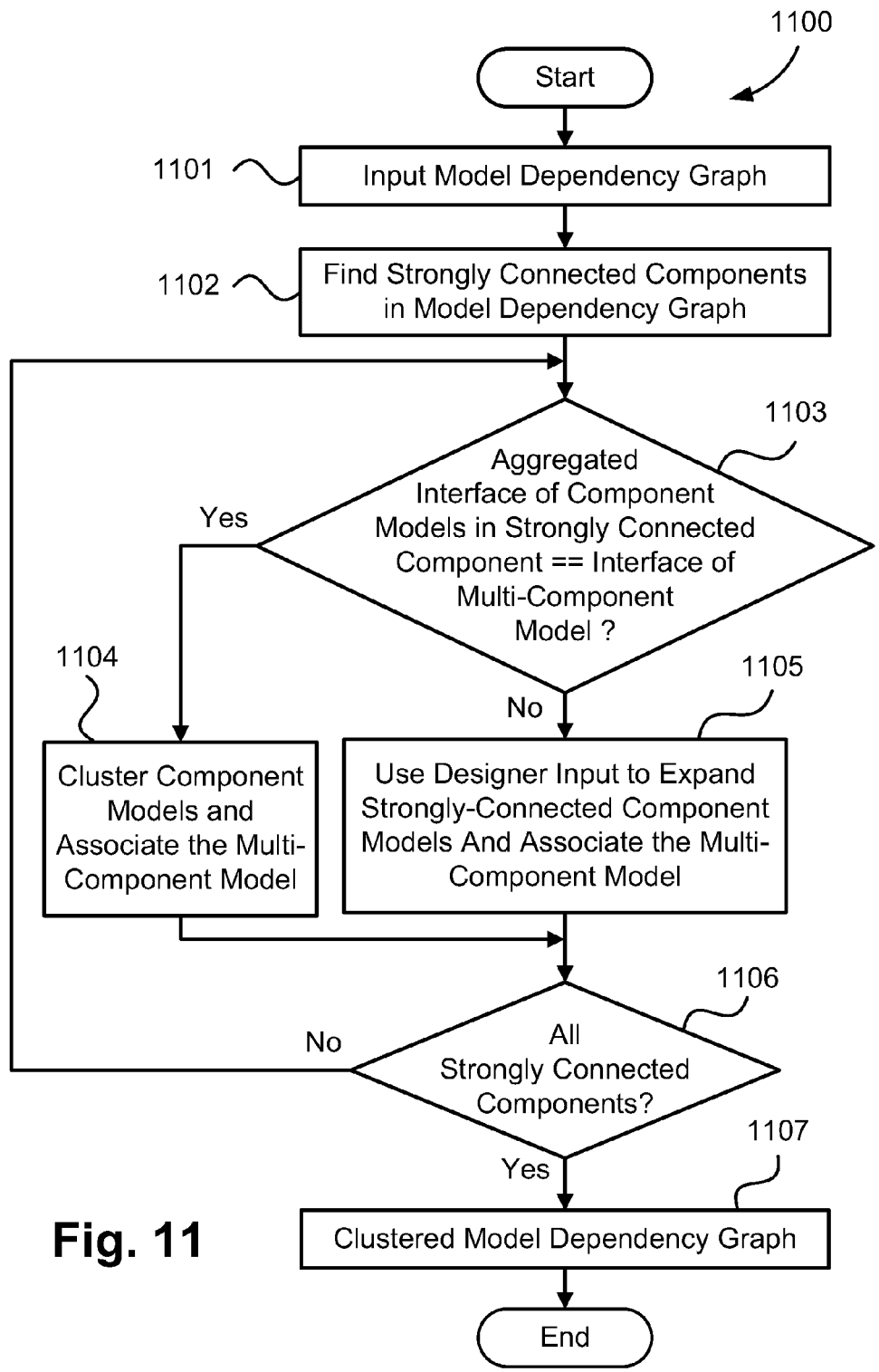
FIG. 11 is a flowchart of a typical process for clustering a model dependency graph.

FIG. 11 is a flowchart of a typical process 1100 for clustering a model dependency graph in an MESoC arrangement. Once a model dependency graph is input in a step 1101 (via the SoC specification 202), strongly connected components in the model dependency graph are found in a following step 1102. In a subsequent check step 1103, a check is made to see if, for a particular set of strongly connected models, an aggregated interface of the constituent component models of the strongly connected components is the same as an interface of the clustered multi-component model (according to I above). If this is the case, then the strongly connected components are clustered and associated with a multi-component model at a clustering step 1104, and control then passes to a decision step 1106. Returning to the decision step 1103, if a FALSE output is produced, then designer input is used to expand the set of strongly connected components and associate the clustered multi-component model at an expansion step 1105, and control then passes to the decision step 1106. The expansion is done by the addition of parent components input by the designer (per II above) such that the aggregated interface of the expanded set of strongly connected components matches the interface of the clustered multi-component model. The steps 1103 to 1105 are repeated until all strongly connected components are processed by testing that all strongly connected components have been processed at a check step 1106. Once all the strongly connected components have been processed, a clustered model dependency graph is generated at a generation step 1107 after which the process 1100 ends.

Generation of Execution Schedule.

A major task which must be performed in order to determine a metric such as throughput, power, energy, area of a system and so on for a complex component-based SoC is to determine how the component models should be executed in order to calculate the desired metric. In other words, it is necessary to determine how the output features of component models used to model the SoC in question are propagated through a model dependency graph, such as the graph 402, that is generated in the generation step 1107 in FIG. 11. Note that if there is an edge from a node u to a node v in a model dependency graph, then the model of u must be executed before the model of v. This is because the model of v will need the output features of the model of u. For example, in FIG. 4B, (ie 402), the multi-component model 403 of the processor 103, the L1 instruction cache 104 and the L1 data cache 105 is executed first, followed by the execution of the model 110 of the processing element 102 and the model 114 of the L2 cache 106. The execution sequence (which is specified in an execution schedule such as 723 in FIG. 7) of component models represents a topological order of the clustered model dependency graph. A topological ordering of a directed graph is a linear ordering of its vertices such that for every directed edge uv from a node u to a node v, the node u comes before the node v in the ordering. A directed acyclic graph has at least one topological order. Therefore, a typical topological ordering of the clustered model dependency graph is employed in the MESoC arrangements to automatically generate the execution schedule for the component models.

Figure 5:
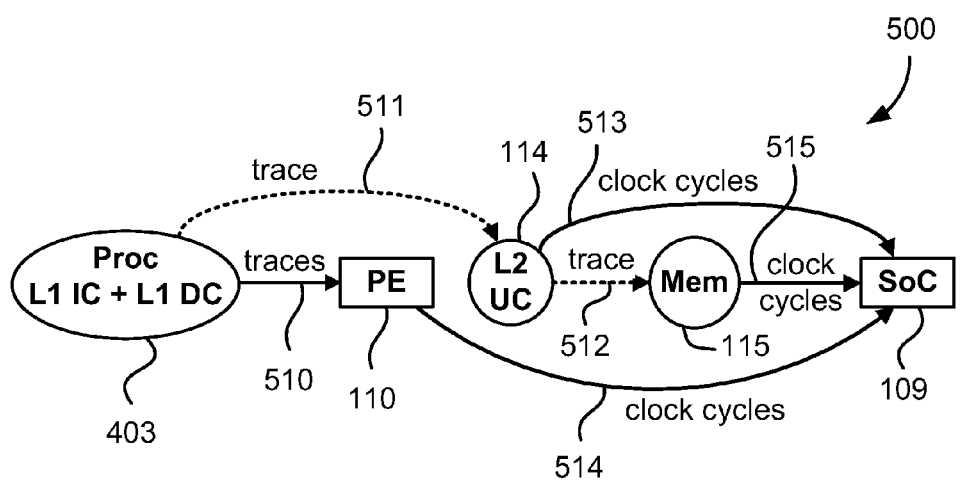
FIG. 5 depicts an execution sequence for determining a metric for a single design point.

FIG. 5 depicts an example of an execution sequence for evaluating the component models in FIG. 4B in order to determine a metric for a single design point of the SoC of FIG. 1A. The execution sequence is shown from left to right in FIG. 5 which shows a topological order being 503, 402, 406, 407, 401. Each model is executed and the output is propagated in the topological manner. An example is discussed below.

Computation of SoC Metric.

Figure 6A:
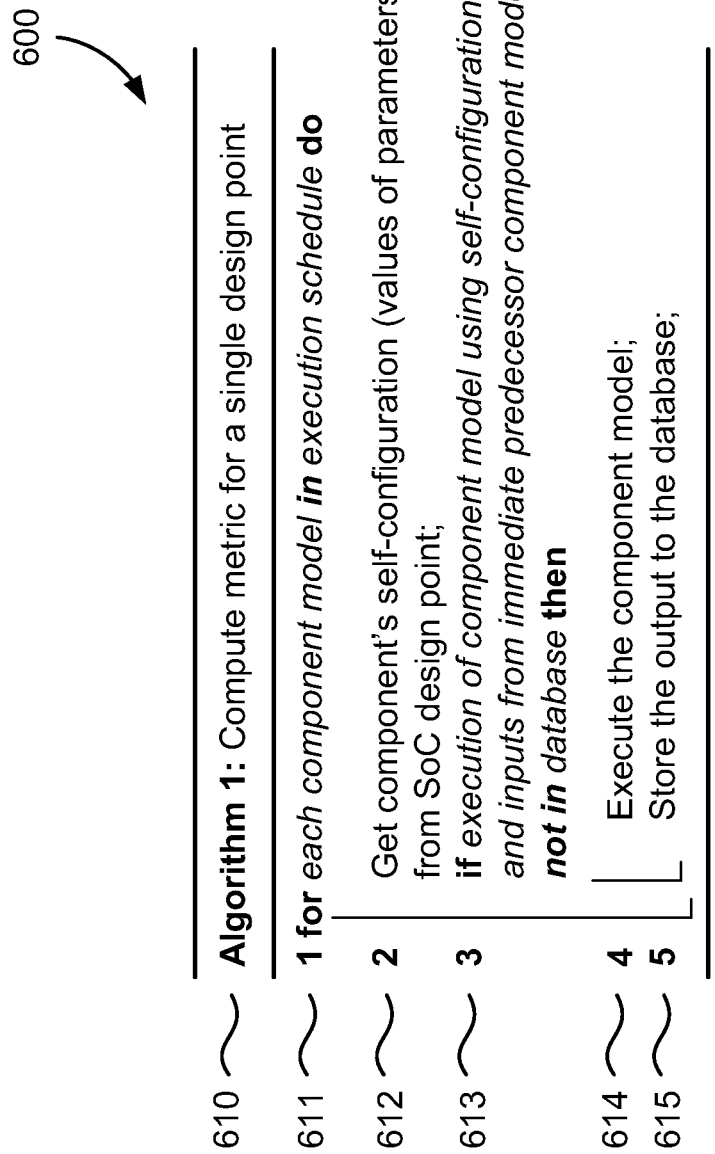
FIG. 6A is pseudo code for an execution schedule for the component models in the model dependency graph of FIG. 3A.

FIG. 6A is a fragment 600 of pseudo code for executing the component models from a model dependency graph (see 402 in FIG. 4B) using an execution schedule (see 723 in FIG. 7). The pseudo-code 600 directs the processor 901 to compute a desired metric for a single design point of an SoC. The algorithm 600 proceeds through a list of component models, specified by an execution schedule such as 723, which specifies an execution sequence for the models in SoC. For each component model encountered in the list, the algorithm derives, at 611, the component self-configuration from the SoC design point. Then, it checks, at 613, whether the component model has already been executed with the retrieved self-configuration and inputs (for the given SoC design point) from all the immediate predecessor component models. If not, the component model is executed with appropriate inputs at 614, and its execution is registered and output features are stored, at 615, in the database 709. The use of database 709 avoids re-execution of a component model with the same inputs, and thus reduces overall execution time. Once the list of component models is exhausted, the output of the last component model is the SoC metric.

For example, we consider the SoC depicted in FIG. 1A and FIG. 1B. As previously noted, a design point for the SoC is one combination of component parameters for the SoC in question. Only the leaf nodes need be considered in specifying a design point for the SoC, namely 111 (having a component design space of 5), 112 (having a component design space of 10), 113 (having a component design space of 5), 114 (having a component design space of 80), and 115 (having a component design space of 1). A single SoC design point is specified as [P-1 IC-1 DC-1 L2-1] which represents a particular set of component design points for the components 103, 104, 105, and 114 respectively. The component 115 only has a single design point which is implicit in the aforementioned SoC design point. In accordance with the execution sequence depicted in FIG. 5, for the SoC design point [P-1 IC-1 DC-1 L2-1], the algorithm will first execute the model of processor and L1 caches 403 using configuration [P-1 IC-1 DC-1]. There are no input features from predecessor component models, however this execution produces the output features 510 and 511. This is followed by the execution of the processing element model 110 using the input feature 510 from its immediate predecessor component model 403, which produces the output feature 514. Then, the L2 cache model 114 will be executed using configuration [L2-1] and the input feature 511 from its immediate predecessor component model 403, which produces the output features 512 and 513. This is followed by the execution of the memory model 115 using its single configuration and the input feature 512 from its immediate predecessor component model 114. Finally, the SoC model will be executed, using the input features 513, 515 and 514 from its immediate predecessor component models 110, 114 and 115 respectively, and its output feature will be the desired metric for the SoC design point.

Figure 6B:
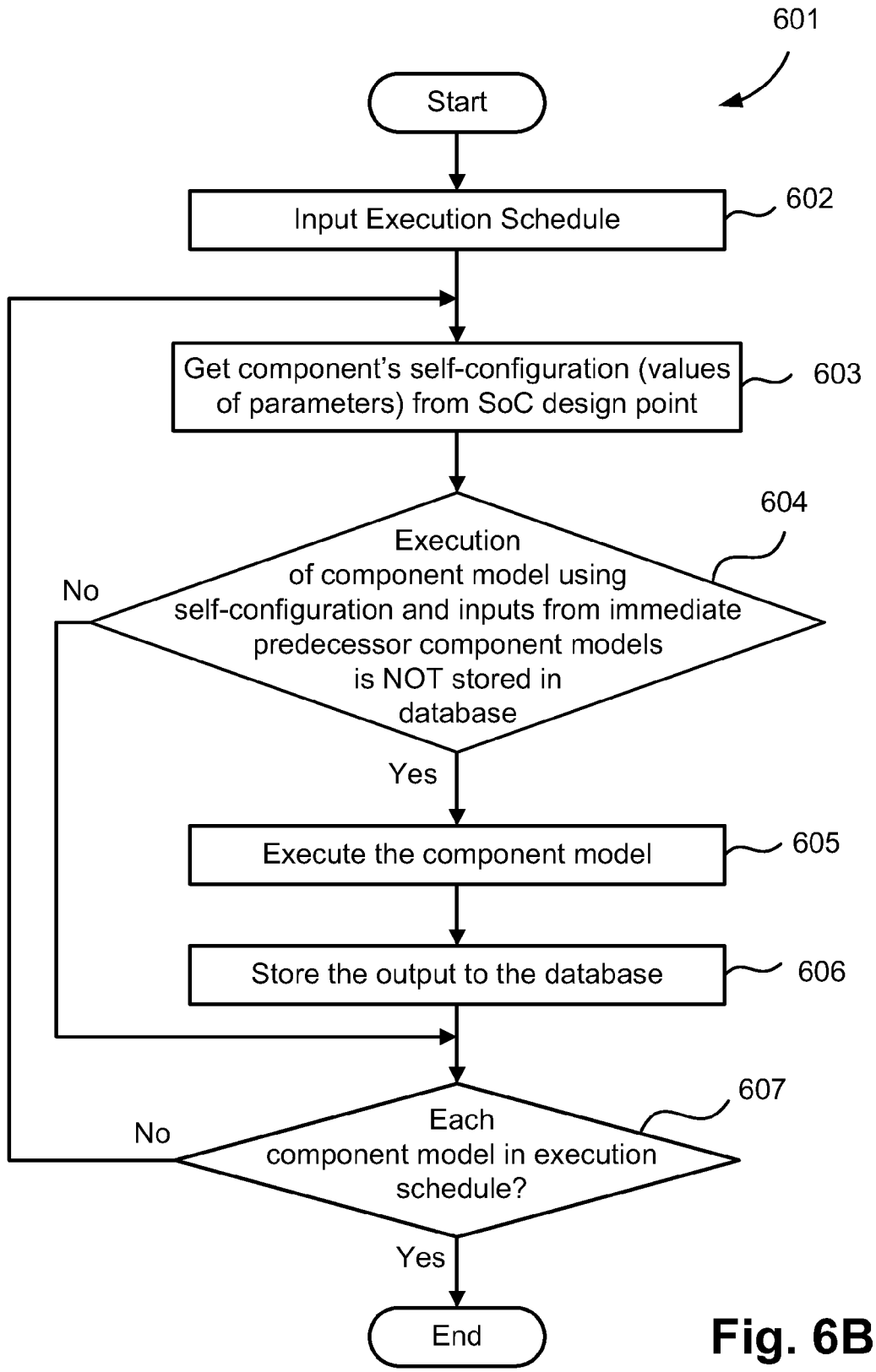
FIG. 6B is a flowchart of a typical process for the execution schedule of the component models in the model dependency graph of FIG. 3A.

FIG. 6B is a flowchart of a typical process for the execution schedule of the component models from the model dependency graph. FIG. 6B is a flowchart corresponding to FIG. 6A. Steps 603, 604, 605, 606, 607, 608 correspond to line 2, 3, 4, 5, 6, 1 in FIG. 6A respectively. The process 601 commences with a start step, after which a step 602 inputs an execution sequence. A following step 603 obtains values of component parameters (self-configuration) from the corresponding SoC design point. Thereafter a decision step 604 determines, for a current component in the execution sequence, if the associated component model has already been executed using the self-configuration and inputs (for the corresponding SoC design point) from all of its immediate predecessor component models, and been registered in the database 709. If this is the case the a following step 605 executes the component model in question with the self-configuration and inputs (for the corresponding SoC design point) from all of its immediate predecessor component models. A following step 606 stores the output of the executed model to the database 709. A following test step 607 determines if all component models in the execution sequence have been executed. If this is the case, the process 601 terminates. Returning to the step 604, if a FALSE value is returned, the process 601 is directed to the step 607. Returning to the step 608, if a FALSE value is returned, the process 601 is directed to the step 603. It is noted that the step 605, when executed for the final component in the execution schedule, produces the desired metric for the SoC design point in question.

Overall Flow.

FIG. 7 is a functional block diagram of a system 700 for computation of an SoC metric according to the disclosed MESoC arrangements. The system 700 comprises the estimation process 205 and the exploration process 206 described in regard to FIG. 2 The inputs to the system 700 consist of the specification 202 of the desired SoC, the library 204 of components and their models, and a description 710 of all the component parameters (which constitute the design space). Initially, in one MESoC arrangement the system parses the input specification 202 for the SoC to create in a step 705 a model dependency graph 721. In another MESoC arrangement, the model dependency graph 721 is provided as an input. The model dependency graph 721 is then traversed in a step 706 to find sets of interdependent (ie strongly connected) component models, which are replaced with multi-component models to form a clustered model dependency graph 722 (also referred to as a modified model dependency graph) in a clustering process in the step 706 with guidance, if necessary, from a designer 702. Finally, the clustered model dependency graph 722 is topologically ordered in a step 707 to generate an execution schedule 723 for the component models. These three steps are performed once for a given SoC.

After the generation of the execution schedule 723 for the component models, the desired metric for any SoC design point can be determined. A Compute Metric process 708 is called once per design point, using the execution sequence 600 in FIG. 6A or flowchart of FIG. 6B to propagate the outputs of the component models through the dependency graph to determine the desired metric for the given SoC design point. This process 708 also populates the database 709 to avoid re-execution of a component model for same inputs.

The exploration process 206 in a design space exploration system can then call this process 708 repeatedly with the design points of interest to obtain their associated metrics.

Figure 10:
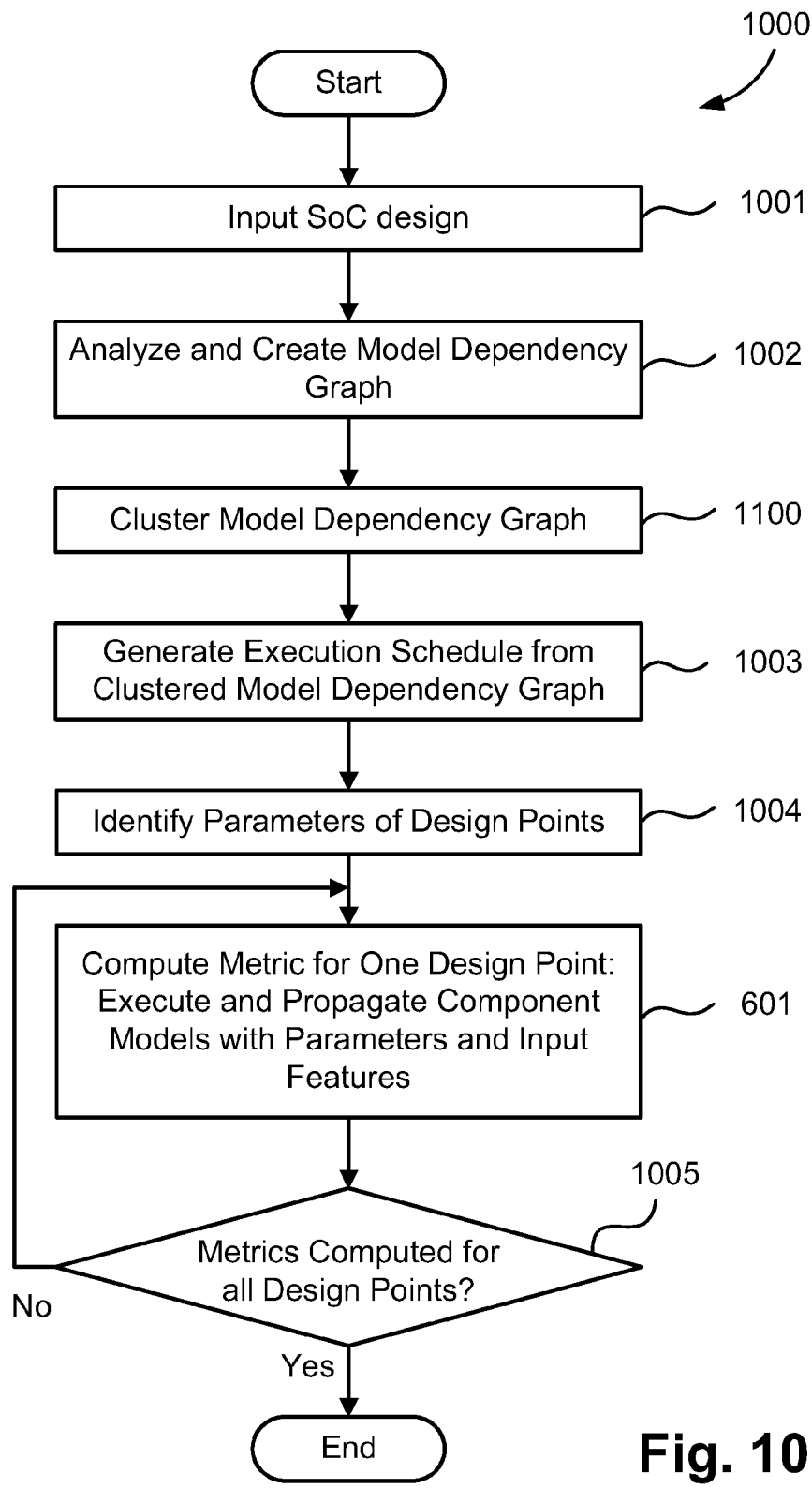
FIG. 10 is a flowchart of a typical process for implementing one MESoC arrangement.

FIG. 10 is a flowchart of a typical process 1000 for implementing one MESoC arrangement using the system 700 in FIG. 7. In an input step 1001 the target SoC design specification 202 is received by the MESoC system 700. Next, an analysis step 1002 creates the model dependency graph 722. Next, strongly-connected components in the model dependency graph 722 are clustered in a clustering step 1100, as was described above in relation to FIG. 11 to form the clustered model dependency graph 722. The clustered model dependency graph 722 is then topologically sorted to generate the execution schedule 723 at a following schedule generation step 1003. At a subsequent identification step 1004, parameters of component models for the design points are identified. For example, the SoC design point [P-1 IC-1 DC-1 L2-1] described in regard to FIG. 5 has parameters [P-1 IC-1 DC-1] for component model 403, and [L2-1] for component model 114. Thereafter a metric for each design point is determined by executing and propagating the outputs of component models according to the identified parameters and input features at a metric computation step 601. The metric computation step 601 is repeated until all design point are computed by checking to see if all metrics, for all design point, have been computed in a check step 1005.

Figure 8:
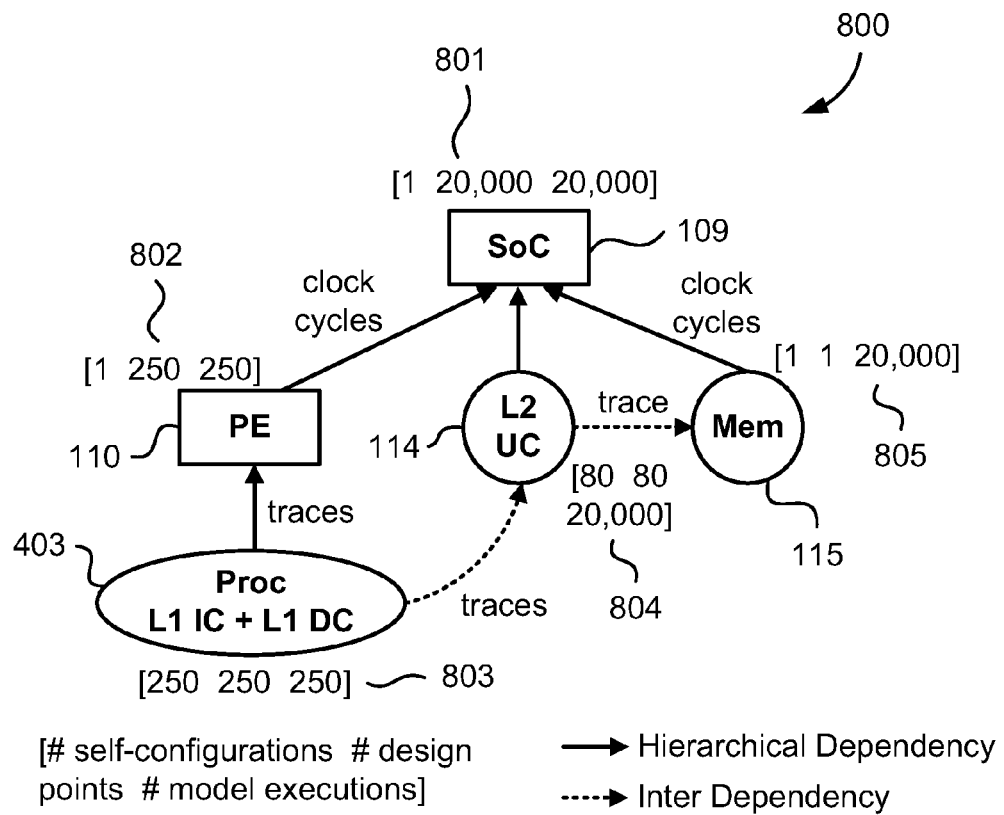
FIG. 8 is an example depicting how a minimal number of executions are used for each component in the disclosed MESoC arrangements.

FIG. 8 is an example depicting how a minimal number of executions are used for each component in the disclosed MESoC arrangements. FIG. 8 depicts how the metrics for all the 20,000 design points are computed. The combined model 403 for the processor 112, the L1 instruction cache 111 and the L1 data cache 113 is executed 250 times (for 250 configurations) as depicted at 803. This is followed by 250 executions of the processing element model 110 as depicted at 802. For every processor and L1 cache configuration, the L2 cache model 114 is executed for all of its 80 configurations, which results in a total of 20,000 executions (as depicted by 804) of the L2 cache model 114. Similarly, the model of the memory 115 is executed for every combination of the processor, the L1 caches and the L2 cache which results in a total of 20,000 executions (as depicted by 805) of the memory model 115. Finally, the model of the SoC 109 is executed 20,000 times which is the total number of design points (as depicted at 801). In general, for a given component, the minimal number of executions of its model are:

model executions=self configurations×Π predecessor self configurations        (5)

Note that self-configurations of a component are from its own parameters only, excluding the configurations contributed by its sub-components. Additionally, all the predecessors of a component model are included rather than just the immediate predecessors. For example, in FIG. 8, the number of executions for the memory model 115 is 1×80×250=20, 000 (805), where 80 and 250 are due to its two predecessor component models, the L2 cache 114, and processor and L1 caches 403. FIG. 8 reports the number of model executions used by the MESoC arrangement for each component, which is minimal.

The MESoC arrangement propagates the outputs of component models through the dependency graph to hierarchically compute the SoC metric, which is generally less time consuming than executing a flat model of the complete SoC. Further, it ensures that a near minimal number of executions of a component's model are used for a given design space. The MESoC performs the above steps automatically which reduces designer's effort and time. Since the MESoC arrangement is not restricted to a specific SoC or a type of component model, it is generic enough to be applied to a wide range of architectures/platforms, and works with existing exploration algorithms.

MESoC Arrangement 2

As described above, an entire system description can be input to the MESoC arrangement. However, partial systems can be processed in the same way. Furthermore, although the description has been directed to SoC systems, the MESoC arrangements can also be applied to embedded systems (not only SoC) as well as cloud systems.

INDUSTRIAL APPLICABILITY

The arrangements described are applicable to the computer and data processing industries and particularly for the SoC design and manufacturing industry.

The foregoing describes only some embodiments of the present invention, and modifications and/or changes can be made thereto without departing from the scope and spirit of the invention, the embodiments being illustrative and not restrictive.

We claim:

1. A method of determining a metric of a system-on-chip (SoC), the method comprising:
receiving a model dependency graph representing the SoC, the model dependency graph having a plurality of nodes representing components of the SoC and their models, and a plurality of directed edges between the nodes representing variables passed between the nodes of the model dependency graph;
modifying the model dependency graph by clustering a plurality of strongly connected nodes in the model dependency graph into a single clustered node to form a clustered model dependency graph;
determining an execution schedule according to a direction of an edge in the clustered model dependency graph; and
executing models in the clustered model dependency graph according to the execution schedule to determine metrics of the SoC.

2. A method according to claim 1, wherein receiving the model dependency graph representing the Soc comprises the steps of:
receiving a specification of the SoC; and
parsing the specification to create the model dependency graph.

3. A method according to claim 1, wherein modifying the model dependency graph comprises the steps of:
traversing the model dependency graph to find at least one set of strongly connected component models; and
replacing said at least one set of strongly connected component models with multi-component models to form said at least one clustered node.

4. A method according to claim 3, wherein replacing said at least one set of strongly connected component models comprises the steps of:
if the interface of the set of strongly connected component models is equivalent to the aggregated interfaces of the component models in the strongly connected set (i) substituting a corresponding multi-component model for the clustered component models in the strongly connected set; and (ii) retaining a parent of the set of strongly connected component models in the clustered model dependency graph; and
if the interface of the set of strongly connected component models is not equivalent to the aggregated interfaces of the component models in the strongly connected set, substituting a corresponding multi-component model for the clustered component models in the strongly connected set including at least one parent of the set of strongly connected component models, in the clustered model dependency graph.

5. A method according to claim 1, wherein determining the execution schedule comprises topologically ordering the clustered model dependency graph according to a direction of an edge in the clustered model dependency graph to generate the execution schedule.

6. An apparatus for determining a metric of a system-on-chip (SoC), the apparatus comprising:
a processor; and
a memory storing a processor executable software program for directing the processor to perform a method comprising the steps of:
receiving a model dependency graph representing the SoC, the model dependency graph having a plurality of nodes representing components of the SoC and a plurality of directed edges between the nodes representing variables passed between the nodes of the model dependency graph;
modifying the model dependency graph by clustering a plurality of strongly connected nodes in the model dependency graph into a single clustered node to form a clustered model dependency graph;
determining an execution schedule according to a direction of an edge in the clustered model dependency graph; and
executing models in the clustered model dependency graph according to the execution schedule to determine metrics of the SoC.

7. A non-transitory computer readable storage medium storing a computer executable program for directing a processor to perform a method for determining a metric of a system-on-chip SoC, the method comprising the steps of:
receiving a model dependency graph representing the SoC, the model dependency graph having a plurality of nodes representing components of the SoC and a plurality of directed edges between the nodes representing variables passed between the nodes of the model dependency graph;

modifying the model dependency graph by clustering a plurality of strongly connected nodes in the model dependency graph into a single clustered node to form a clustered model dependency graph;

determining an execution schedule according to a direction of an edge in the clustered model dependency graph; and executing models in the clustered model dependency graph according to the execution schedule to determine metrics of the SoC.

* * * * *